(12) United States Patent
Chou et al.

(10) Patent No.: US 11,143,346 B2
(45) Date of Patent: Oct. 12, 2021

(54) CHECK JOINT STRUCTURE FOR CONNECTION OF AN AIR NOZZLE OF A TIRE AND A CONNECTOR OF A CONNECTION HOSE OF AN AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

( * ) Notice: Subject to any disclaimer, the term of this patent is extended or adjusted under 35 U.S.C. 154(b) by 0 days.

(21) Appl. No.: 17/027,547

(22) Filed: Sep. 21, 2020

(65) Prior Publication Data

US 2021/0088161 A1 Mar. 25, 2021

(51) Int. Cl.
*F16L 29/04* (2006.01)
*B29C 73/02* (2006.01)
*B29C 73/16* (2006.01)

(52) U.S. Cl.
CPC ............ *F16L 29/04* (2013.01); *B29C 73/025* (2013.01); *B29C 73/166* (2013.01)

(58) Field of Classification Search
CPC ... B60C 29/064; B60C 29/062; B29C 73/166; B60S 5/04; B29L 2030/00; F16K 15/20; Y10T 137/3724; F16L 29/04; F16L 37/40
USPC ......................................................... 141/38
See application file for complete search history.

(56) References Cited

U.S. PATENT DOCUMENTS

| | | | | |
|---|---|---|---|---|
| 2008/0257416 | A1* | 10/2008 | Hickman | F16L 29/02 137/223 |
| 2013/0105055 | A1* | 5/2013 | Chou | B60S 5/043 152/416 |
| 2013/0284312 | A1* | 10/2013 | Chou | F16K 15/20 141/38 |
| 2019/0193349 | A1* | 6/2019 | Chou | B29C 73/166 |
| 2020/0368980 | A1* | 11/2020 | Dowel | F16K 15/026 |

FOREIGN PATENT DOCUMENTS

WO WO-2013110486 A1 * 8/2013 ........... B29C 73/166

* cited by examiner

*Primary Examiner* — Timothy P. Kelly

(57) ABSTRACT

A check joint structure for a connection of an air nozzle of a tire and a connector of a connection hose of an air compressor, the air compressor contains: a box, a sealant supply can, and a connection hose. The box includes a body of the air compressor. The sealant supply can includes an open segment and a supply tube. The connection hose includes a first segment and a second segment. The second segment has a check connector which includes a fitting sleeve, and the fitting sleeve has a threaded orifice, a through orifice, and a projected shoulder. A cylindrical base includes a cylindrical room, a stepped coupling segment, a conduit, and a first stepped portion. A first spring is received into the cylindrical room to abut against the first stepped portion. A valve bolt includes a contacting element fitted thereon.

5 Claims, 9 Drawing Sheets

CHECK JOINT STRUCTURE FOR CONNECTION OF AN AIR NOZZLE OF A TIRE AND A CONNECTOR OF A CONNECTION HOSE OF AN AIR COMPRESSOR

FIELD OF THE INVENTION

The present invention relates to a check joint structure for connection of an air nozzle of a tire and a connector of a connection hose of an air compressor, which is capable of avoiding counterflow and eruption of a chemical sealant.

BACKGROUND OF THE INVENTION

A conventional air nozzle of a tire of a vehicle is used to inflate or discharge air into or from the tire. Furthermore, a conventional tire repair device is employed to feed a chemical sealant and to inflate air into a tire that is broken. The tire repair device is connected to an air compressor, and a sealant supply can is connected to an outlet valve of the air compressor, wherein compressed air is controlled by a control valve to output the chemical sealant out of a connector on a distal end of a connection hose with the compressed air. However, when a connection structure of the connector of the connection hose and the air core of the tire are not operated properly, the chemical sealant easily erupts out of the connector of the connection hose.

The present invention has arisen to mitigate and/or obviate the afore-described disadvantages.

SUMMARY OF THE INVENTION

The primary aspect of embodiments of the present invention is to provide a check joint structure for a connection of an air nozzle of a tire and a connector of a connection hose of an air compressor is capable of feeding chemical sealant and inflating compressed air into a tire when the tire is broken.

Another aspect of embodiments of the present invention is to provide a check joint structure for a connection of an air nozzle of a tire and a connector of a connection hose of an air compressor that is capable of avoiding counterflow and eruption of a chemical sealant.

DETAILED DESCRIPTION OF THE PREFERRED EMBODIMENTS

Figure 1:
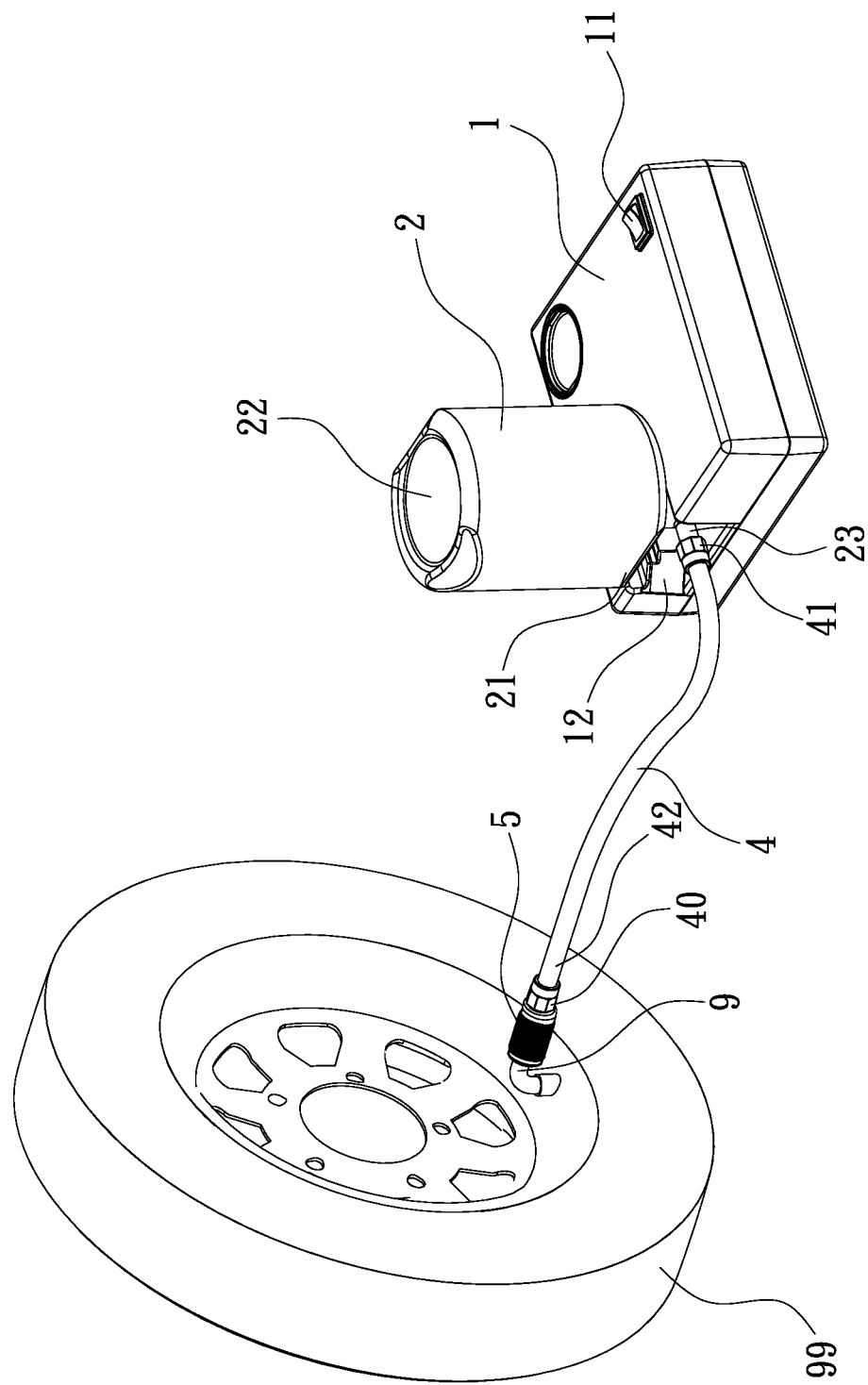
FIG. 1 is a perspective view showing the application of a check joint structure for a connection of an air nozzle of a tire and a connector of a connection hose of an air compressor according to a preferred embodiment of the present invention.
Figure 2:
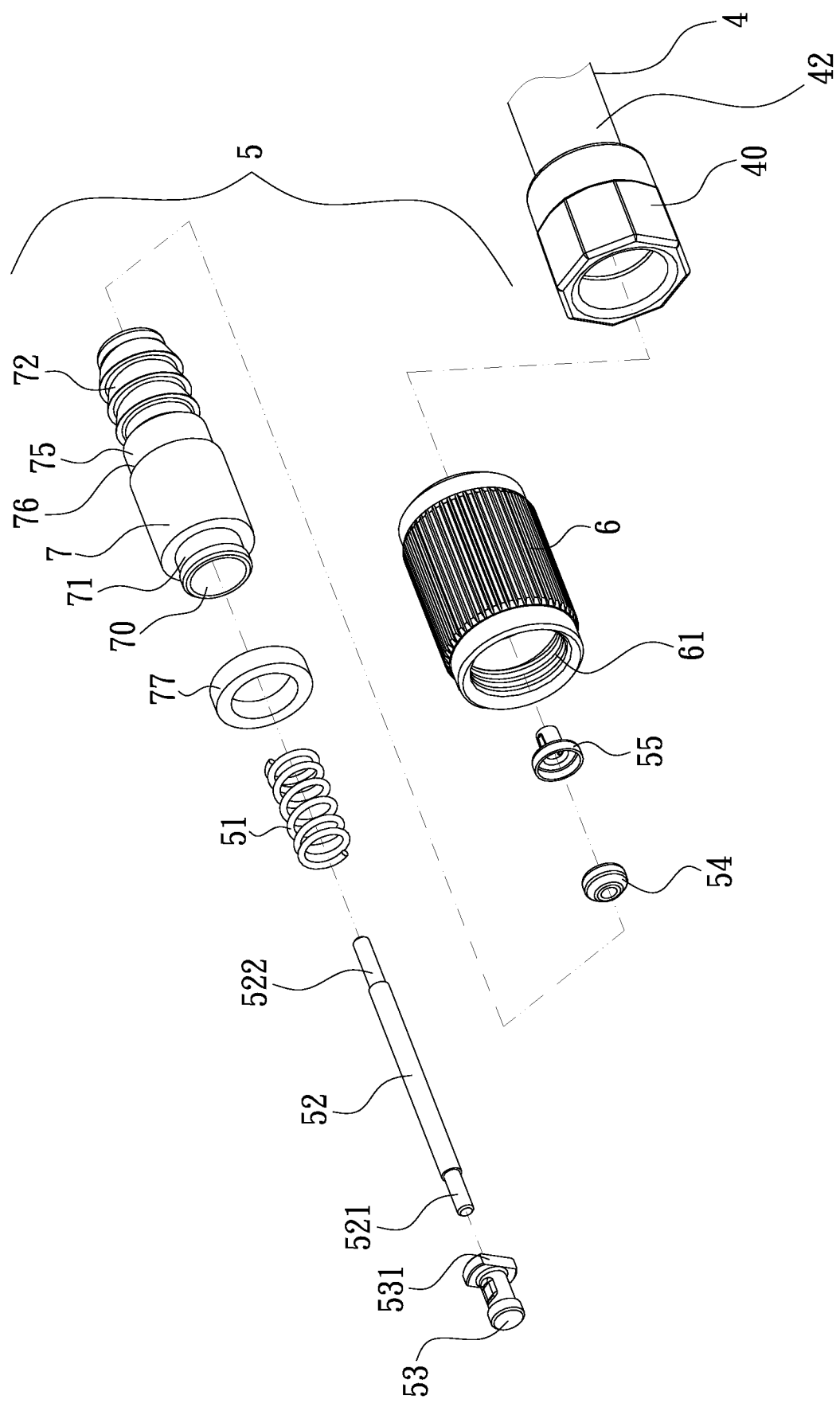
FIG. 2 is a perspective view showing the exploded components of the check joint structure according to the preferred embodiment of the present invention.
Figure 3:
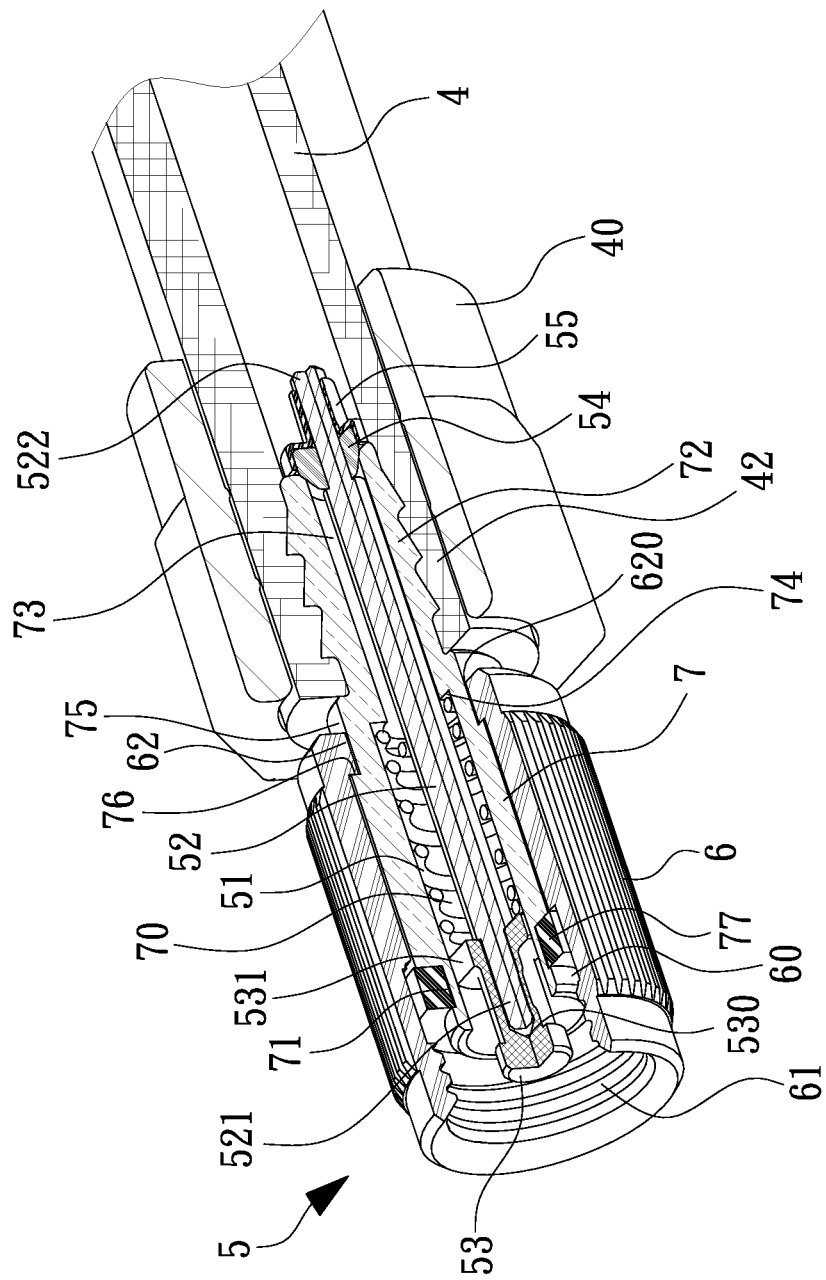
FIG. 3 is a cross-sectional perspective view showing the assembly of the check joint structure according to the preferred embodiment of the present invention.

With reference to FIGS. 1-3 an air compressor according to a preferred embodiment of the present invention comprises: a box 1, sealant supply can 2, and a connection hose 4.

The box 1 includes a button 11 fixed on a top thereof, a coupling orifice 12 defined on a peripheral side thereof, and a body of the air compressor (not shown) accommodated in the box 1. The connection hose 4 includes a first segment 41 formed on a first end thereof, and the connection hose 4 also includes a second segment 42 formed on a second end thereof and having a check connector 5 connected on the second segment 42.

The sealant supply can 2 is connected on the coupling orifice 12, and the tire sealant supply can 2 includes an open segment 21 extending downward, a bottom fringe 22 extending upward, and a supply tube 23 configured to engage with the first segment 41 of the connection hose 4. The check connector 5 of the second segment 42 of the connection hose 4 is screwed with an air nozzle 9 of a tire 99, when feeding chemical sealant and inflating compressed air into the tire 99 that is broken. After the box 1 is started by a vehicle power supply or other DC power supply, the compressed air from the air compressor forces the chemical sealant of the sealant supply can 2 to flow into the tire 99 via the connection hose 4, thus repairing and inflating the tire 99. The tire 99 is any one of an automobile tire, a motorcycle tire, and a bicycle tire.

Figure 4:
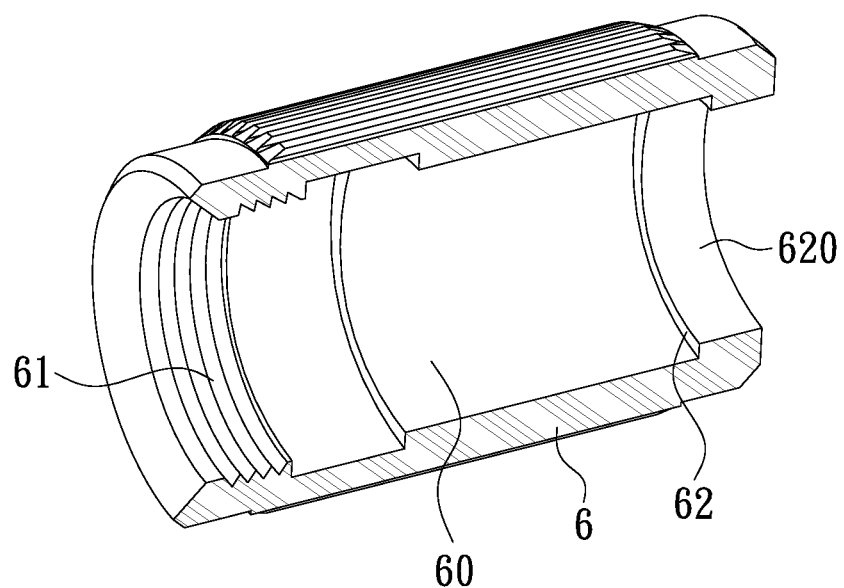
FIG. 4 is a cross-sectional perspective view showing the assembly of a fitting sleeve of the check joint structure according to the preferred embodiment of the present invention. 5 is a cross-sectional perspective view showing the assembly of a cylindrical base of the check joint structure according to the preferred embodiment of the present invention.

Referring to FIGS. 2-7, a check joint structure for a connection of the air nozzle of the tire and a connector of the connection hose of the air compressor is used to avoid eruption of the chemical sealant. The check joint structure comprises: the check connector 5 connected on the second segment 42 of the connection hose 4. The check connector 5 includes a fitting sleeve 6 (as shown in FIG. 4) formed in a cylindrical shape, and the fitting sleeve 6 has a chamber 60 defined therein, with a threaded orifice 61 formed in a first end thereof and having female threads, a through orifice 620 defined on a second end of the fitting sleeve 6, and a projected shoulder 62 formed on an inner wall of the chamber 60 proximate to the through orifice 620. A diameter of the projected shoulder 62 is greater than a diameter of the through orifice 620 and the threaded orifice 61, the chamber 60, and the through orifice 620 are in communication with one another.

Figure 5:
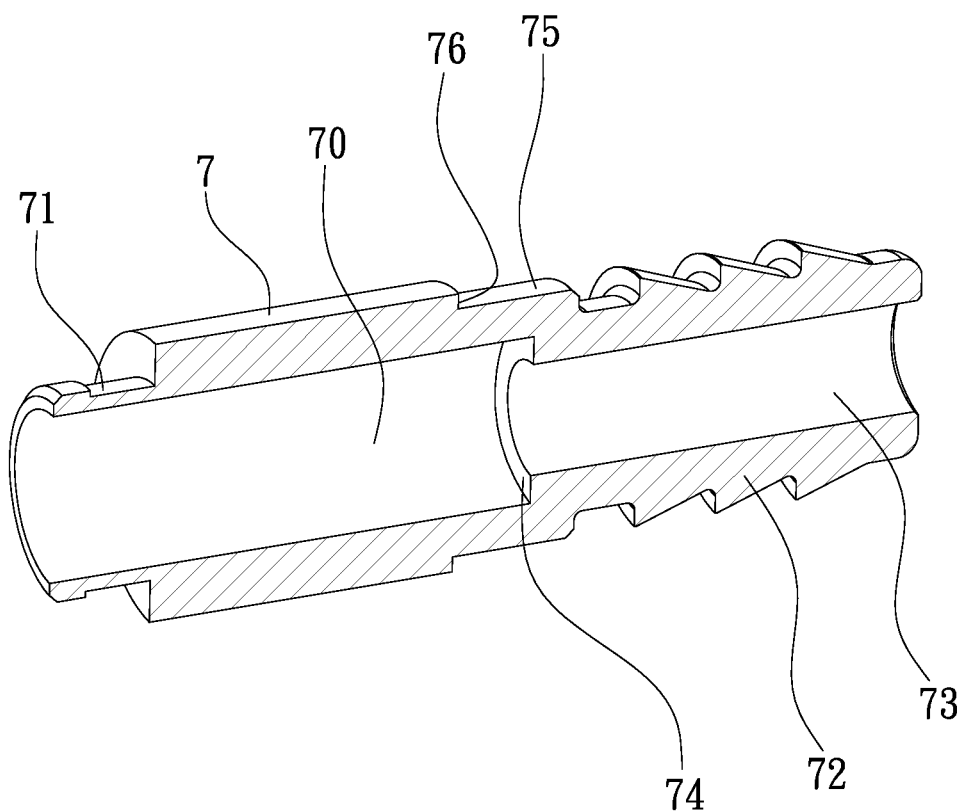
Figure 6:
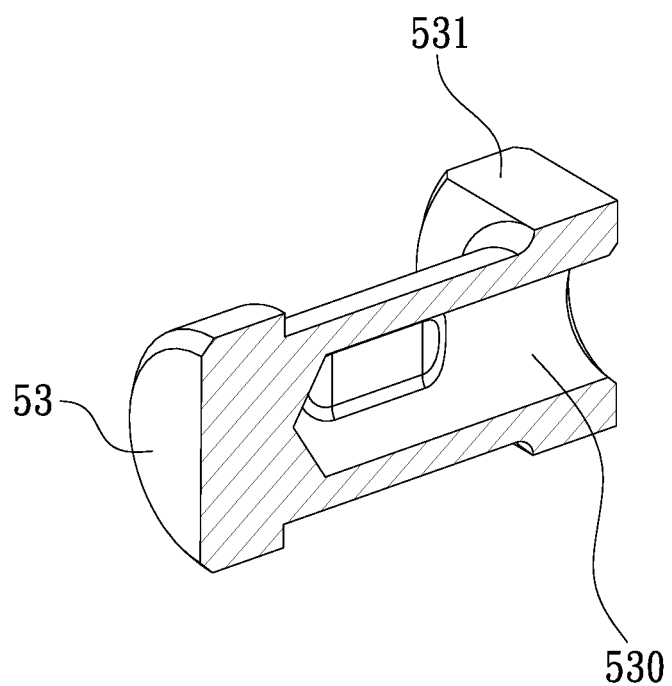
FIG. 6 is a cross-sectional perspective view showing the assembly of a contacting element of the check joint structure according to the preferred embodiment of the present invention.

A cylindrical base 7 (as shown in FIG. 5) includes a cylindrical room 70, a trench 71 formed on an outer wall of a first end of the cylindrical base 7, a stepped coupling segment 72 extending along an outer wall of a second end of the cylindrical base 7, and a conduit 73 defined in the stepped coupling segment 72 and in communication with the cylindrical room 70. A diameter of the cylindrical room 70 is greater than a diameter of the conduit 73, and the cylindrical base 7 further includes a first stepped portion 74 formed between the cylindrical room 70 and the conduit 73, and a recessed section 75 formed proximate to the stepped coupling segment 72. A diameter of the cylindrical base 7 is greater than a diameter of the recessed section 75, and a second stepped portion 76 is defined between the cylindrical base 7 and the recessed section 75. A first seal ring 77 is fit on the trench 71 of the cylindrical base 7. A first spring 51 is received into the cylindrical room 70 of the cylindrical base 7 so that a first end of the first spring 51 abuts against the first stepped portion 74.

A valve bolt 52, formed into a columnar shape, includes a first depressed section 521 that is formed on a first end of the valve bolt 52, A second depressed section 522 is formed on a second end of the valve bolt 52. A contacting element 53 has a notch 530 defined in the contacting element 53, with at least one cutout 531 defined on an outer wall of the contacting element 53, wherein the contacting element 53 is fit into the first depressed section 521 of the valve bolt 52 by way of the notch 530.

Figure 7:
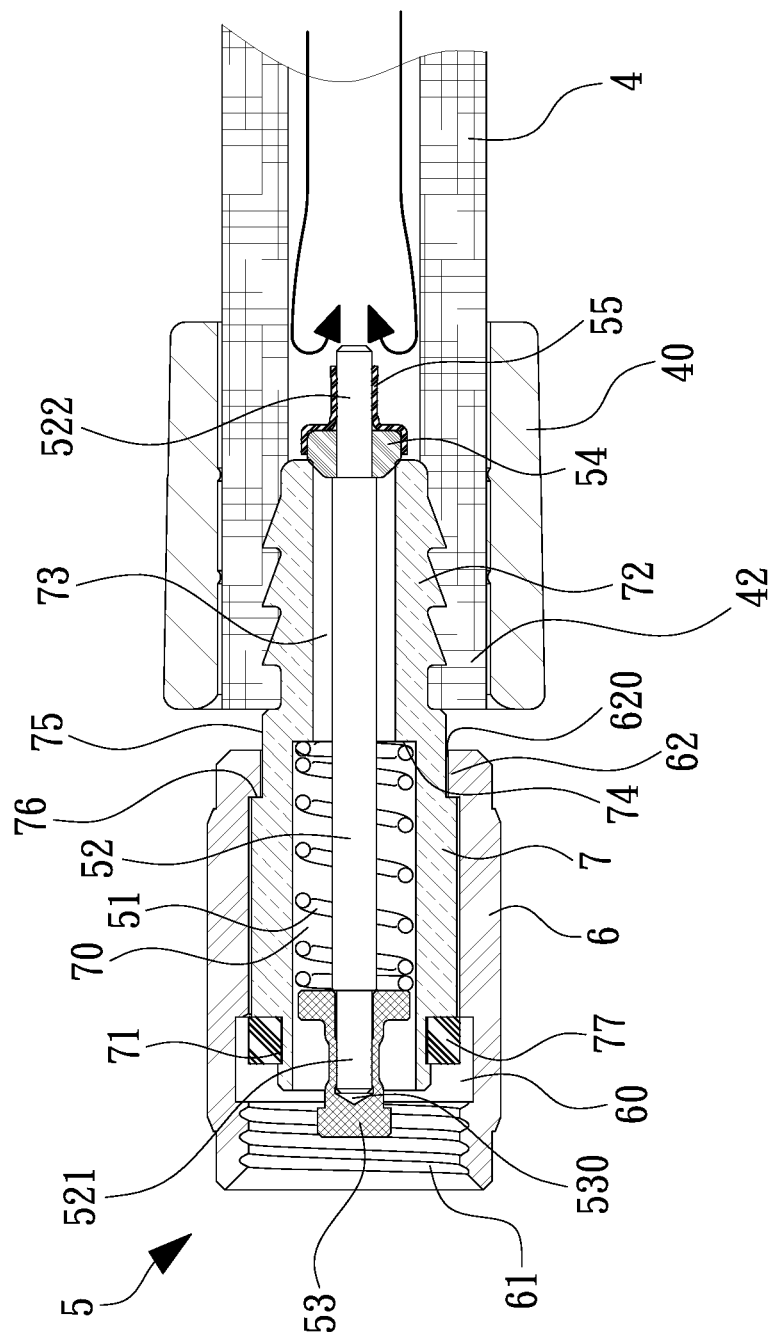
FIG. 7 is a cross sectional view showing assembly of the check joint structure and the connection hose according to the preferred embodiment of the present invention.

The second end of the valve bolt 52 is inserted through the cylindrical room 70 of the cylindrical base 7 and the conduit 73 of the stepped coupling segment 72 to extend out of the stepped coupling segment 72 of the cylindrical base 7, and the contacting element 53 abuts against a second end of the first spring 51, as shown in FIGS. 3 and 7. A first abutting loop 54 is fit on the second depressed section 522 of the valve bolt 52 and fixed by a lock element 55, such that the first spring 51 pushes the valve bolt 52 so that first abutting loop 54 of the valve bolt 52 contacts with the stepped coupling segment 72 of the cylindrical base 7 and closes the conduit 73.

The stepped coupling segment 72 of the cylindrical base 7 is put into the chamber 60 from the threaded orifice 61 of the fitting sleeve 6 via the through orifice 620, such that the projected shoulder 62 contacts with the second stepped portion 76 of the cylindrical base 7, and the stepped coupling segment 72 of the cylindrical base 7 extends out of the fitting sleeve 6 to connect with the second segment 42 of the connection hose 4. A fixing bushing 40 is configured to connect together the connection hose 4 and the check connector 5, as illustrated in FIG. 3. The first spring 51 forces the first abutting loop 54 of the valve bolt 52 to contact with the stepped coupling segment 72 of the cylindrical base 7 and to close the conduit 73 of the stepped coupling segment 72.

Referring to FIG. 7 after the button 11 of the box 1 is turned on (as shown in FIG. 1), pressure from the compressed air of the air compressor forces the chemical sealant to flow, but the chemical sealant does not flow through the conduit 73 of the stepped coupling segment 72 because the first abutting loop 54 of the valve bolt 52 tightly contacts with the stepped coupling segment 72 of the cylindrical base 7 to stop the chemical sealant flowing through the conduit 73 of the stepped coupling segment 72, thus avoiding eruption of the chemical sealant.

Figure 8:
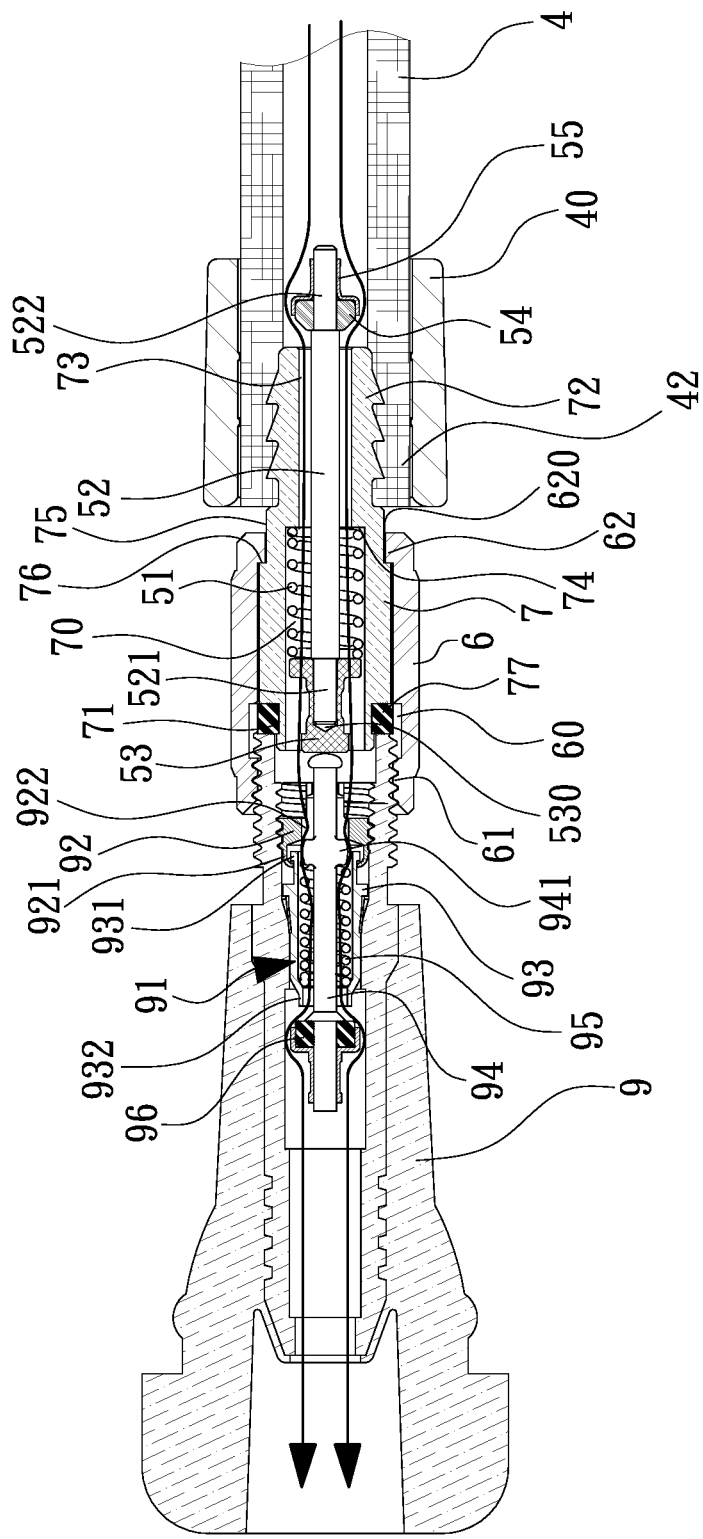
FIG. 8 is a cross sectional view showing the operation of the check joint structure according to the preferred embodiment of the present invention.
Figure 9:
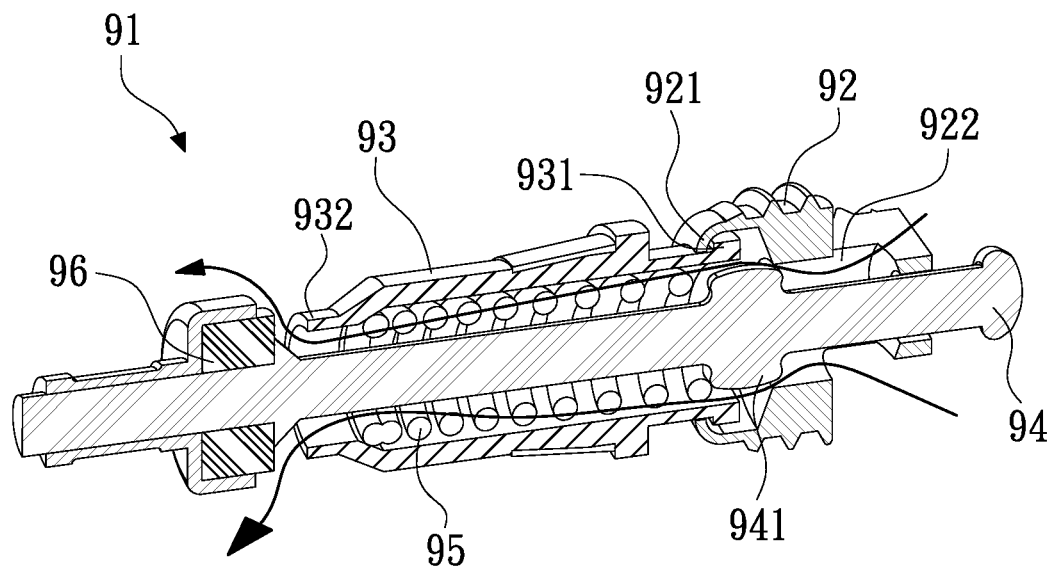
FIG. 9 is a cross-sectional perspective view showing the assembly of a valve core assembly of the air nozzle of the tire according to the preferred embodiment of the present invention.

As shown in FIGS. 8 and 9, a valve core assembly 91 is accommodated in the air nozzle 9 of the tire 99, and the valve core assembly 91 includes a mounting 92, an arcuate stop shoulder 921 surrounding a mouth of the mounting 92 and extending inward from an end of the mounting 92, and an aperture 922 defined in the mounting 92. A hollow receiving sleeve 93 having a retaining shoulder 931 is formed on a first end of the hollow receiving sleeve 93, and a holder 932 is formed on a second end of the hollow receiving sleeve 93, A central needle 94 is formed in a columnar shape and has multiple spaced ribs 941 formed on the central needle 94. A second spring 95 is fit with the central needle 94, and a first end of the second spring 95 abuts against the multiple spaced ribs 941 of the central needle 94. The central needle 94 is received in the hollow receiving sleeve 93 from the first end of the hollow receiving sleeve 93 so that a second end of the second spring 95 contacts with the holder 932, and the second spring 95 is surrounded by the receiving hollow sleeve 93. A second abutting loop 96 is fit on a first end of the central needle 94, After the hollow receiving sleeve 93 is connected with the mounting 92, the arcuate stop shoulder 921 of the mounting 92 engages with the retaining shoulder 931 of the hollow receiving sleeve 93, a second end of the central needle 94 extends out of the aperture 922 of the mounting 92, and the second spring 95 pushes the second abutting loop 96 of the central needle 94 to close the holder 932 of the hollow receiving sleeve 93.

As illustrated in FIGS. 1 and 8 when the threaded orifice 61 of the check connector 5 is screwed with the air nozzle 9 of the tire 99, the valve bolt 52 of the check connector 5 contacts with and urges the central needle 94 of the air nozzle 9 of the tire 99 to move so that the second abutting loop 96 of the central needle 94 removes from the holder 932 of the hollow receiving sleeve 93 (as shown in FIG. 9). When the threaded orifice 61 of the check connector 5 is screwed with the air nozzle 9 of the tire 99, the valve bolt 52 is urged by the central needle 94 of the air nozzle 9 to press the first spring 51 so that the first abutting loop 54 detaches from the second segment 72 of the cylindrical base 7, and the conduit 73 of the stepped coupling segment 72 is communicated. In the meantime, the chemical sealant pushed by the compressed air flows into the tire 99 via the conduit 73 of the cylindrical base 7, the cylindrical room 70 of the cylindrical base 7, the at least one cutout 531 of the contacting element 53 of the valve bolt 52, the chamber 60 and the threaded orifice 61 of fitting sleeve 6, the aperture 922 of the mounting 92 of the air nozzle 9, the hollow receiving sleeve 93, and the holder 932 of the hollow receiving sleeve 93, thus feeding the chemical sealant and the compressed air into the tire 99.

Thereby, the check joint structure for the connection of the air nozzle of the tire and the connector of the connection hose of the air compressor is capable of avoiding eruption of the chemical sealant in an incorrect operation.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:
1. A check joint structure for a connection of an air nozzle of a tire and a connector of a connection hose of an air compressor, the check joint structure comprising:
    a fitting sleeve, wherein the fitting sleeve has a threaded orifice formed in a first end thereof and having female threads, a through orifice defined on a second end of the fitting sleeve, and a projected shoulder formed on an inner wall of the through orifice, wherein a diameter of the projected shoulder is greater than a diameter of the through orifice, and the threaded orifice is in communication with the through orifice;

a cylindrical base comprising a cylindrical room, a stepped coupling segment extending along an outer wall of a first end of the cylindrical base, and a conduit defined in the stepped coupling segment and in communication with the cylindrical room, wherein a diameter of the cylindrical room is greater than a diameter of the conduit, and the cylindrical base further includes a first stepped portion formed between the cylindrical room and the conduit;

a first spring received in the cylindrical room of the cylindrical base, a first end of the first spring abutting against the first stepped portion; and a valve bolt formed in a columnar shape and comprising a contacting element fit on a first end of the valve bolt, a second end of the valve bolt inserted through the cylindrical room of the cylindrical base and the conduit of the stepped coupling segment to extend out of the stepped coupling segment of the cylindrical base, the contacting element abutting against a second end of the first spring, wherein a first abutting loop is fir on the second end of the valve bolt;

wherein the first spring pushes the valve bolt so that first abutting loop of the valve bolt contacts with the stepped coupling segment of the cylindrical base and closes the conduit.

2. The check joint structure as claimed in claim 1, wherein:

the fitting sleeve has a chamber defined therein, and the threaded orifice, the chamber, and the through orifice are in communication with one another; and the cylindrical base includes a trench formed on an outer wall of a second end of the cylindrical base, a recessed section formed proximate to the stepped coupling segment, a diameter of the cylindrical base being greater than a diameter of the recessed section, and a second stepped portion is defined between the cylindrical base and the recessed section.

3. The check joint structure as claimed in claim 2, wherein a first seal ring is fit on the trench of the cylindrical base and the stepped coupling segment of the cylindrical base is disposed in the chamber from the threaded orifice of the fitting sleeve via the through orifice so that the projected shoulder contacts with the second stepped portion of the cylindrical base.

4. The check joint structure as claimed in claim 3, wherein:

the valve bolt includes a first depressed section formed on the first end of the valve bolt, with a second depressed section formed on the second end of the valve bolt;

the contacting element has a notch defined therein;

the contacting element has at least one cutout defined on an outer wall thereof, wherein the contacting element is disposed in the first depressed section of the valve bolt by way of the notch; and a lock element is configured to fix the first abutting loop on the second depressed section of the valve bolt.

5. The check joint structure as claimed in claim 2, wherein the stepped coupling segment of the cylindrical base extends out of the fitting sleeve to connect with the second segment of the connection hose, and a fixing bushing is configured to connect the connection hose and the check connector.

* * * * *